(12) United States Patent
Dünnwald

(10) Patent No.: US 8,978,876 B2
(45) Date of Patent: Mar. 17, 2015

(54) ARRANGEMENT FOR STRIPPING MATERIAL FROM THE LOWER RUN OF THE CONVEYOR BELT OF A BELT CONVEYOR

(76) Inventor: Wilfried Dünnwald, Kamp-Lintfort (DE)

( * ) Notice: Subject to any disclaimer, the term of this patent is extended or adjusted under 35 U.S.C. 154(b) by 129 days.

(21) Appl. No.: 13/519,225

(22) PCT Filed: Nov. 19, 2010

(86) PCT No.: PCT/EP2010/067797
§ 371 (c)(1),
(2), (4) Date: Aug. 10, 2012

(87) PCT Pub. No.: WO2011/080006
PCT Pub. Date: Jul. 7, 2011

(65) Prior Publication Data
US 2012/0305367 A1  Dec. 6, 2012

(30) Foreign Application Priority Data
Dec. 30, 2009 (DE) .......................... 10 2009 060 875

(51) Int. Cl.
*B65G 45/16* (2006.01)
(52) U.S. Cl.
CPC ...................................... *B65G 45/16* (2013.01)
USPC ......................................... 198/499; 198/497
(58) Field of Classification Search
CPC ............................... B65G 45/12; B65G 45/16
USPC ........................................................ 198/499
See application file for complete search history.

(56) References Cited

U.S. PATENT DOCUMENTS

| | | | | |
|---|---|---|---|---|
| 4,349,098 A | * | 9/1982 | Veenhof | 198/497 |
| 4,535,883 A | * | 8/1985 | Kerr | 198/499 |
| 4,768,645 A | * | 9/1988 | Farris | 198/499 |
| 4,811,833 A | * | 3/1989 | Slikker | 198/499 |
| 4,821,867 A | * | 4/1989 | Veenhof | 198/499 |
| 4,887,329 A | * | 12/1989 | Perneczky | 15/256.53 |
| 7,584,835 B2 | * | 9/2009 | Wimsatt et al. | 198/497 |
| 7,726,466 B2 | * | 6/2010 | Mat | 198/499 |

FOREIGN PATENT DOCUMENTS

| | | | | | |
|---|---|---|---|---|---|
| DE | 19955421 A1 | 5/2001 | | | |
| DE | 10255253 B3 | 6/2004 | | | |
| EP | 0270143 A1 | 6/1988 | | | |
| GB | 1159738 | 7/1969 | | | |
| WO | WO2004/048235 | * | 6/2004 | ............. | B65G 45/16 |
| WO | WO 2004/048235 | * | 6/2004 | ............. | B65G 45/16 |

\* cited by examiner

*Primary Examiner* — Gene Crawford
*Assistant Examiner* — Thomas Randazzo
(74) *Attorney, Agent, or Firm* — The Webb Law Firm

(57) ABSTRACT

An arrangement for stripping material from the lower run of the conveyor belt includes scrapers divided into groups, arranged over the width of the conveyor belt and lying resiliently elastically against the underside of the lower run. The scrapers are arranged obliquely to the direction of travel of the lower run. The scrapers of a first group are oriented angled relative to the scrapers of an adjacent second group. The arrangement provides for each scraper to be supported at least indirectly on the supporting frame of the belt conveyor via at least two wound leg springs. Each respective leg spring is connected by its upper end to a front or rear end portion of the scraper, and is connected rotatably by its lower end to a transverse strut of a supporting frame.

11 Claims, 7 Drawing Sheets

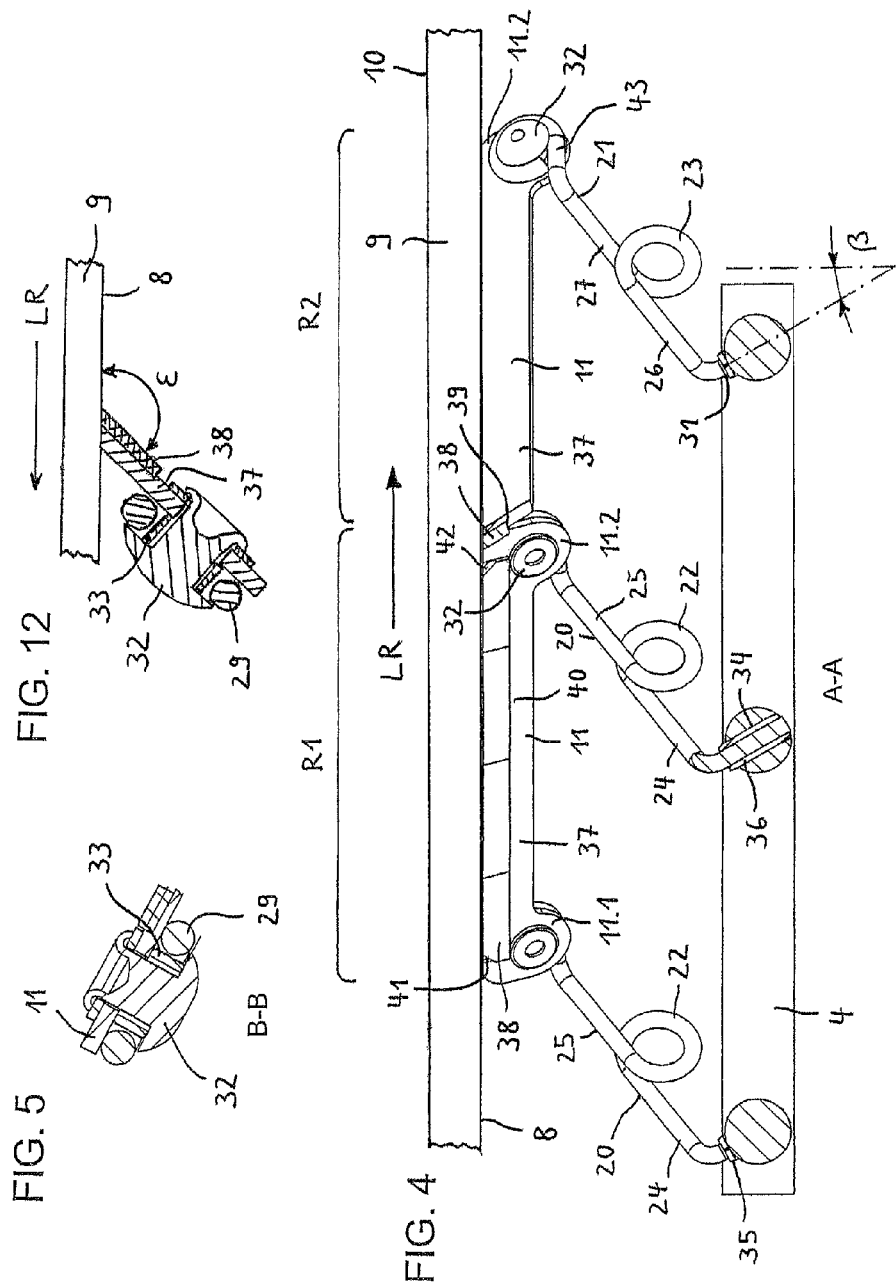

US 8,978,876 B2

ARRANGEMENT FOR STRIPPING MATERIAL FROM THE LOWER RUN OF THE CONVEYOR BELT OF A BELT CONVEYOR

BACKGROUND OF THE INVENTION

1. Field of the Invention

The invention relates to an arrangement for stripping material from the lower run of the conveyor belt of a belt conveyor, which arrangement has scrapers which are divided into groups, are arranged distributed over the width of the conveyor belt and lie resiliently elastically against the underside of the lower run, which scrapers are all arranged obliquely to the direction of travel of the lower run, the scrapers of a first group being oriented angled relative to the scrapers of an adjacent second group.

2. Description of the Related Art

An arrangement of this type is known from DE 102 55 253 B3. The scrapers of the known arrangement are formed like strips, and are supported in a pivotably movable manner indirectly on the supporting structure of the belt conveyor, in each case via two links which are associated with each other in a gable-roof-like manner beneath the lower run. Therein, in each case a first link, which points obliquely downwards counter to the direction of travel of the lower run and which is of arcuate design, is fixed in articulated manner by its upper end to the front end of the scraper which points counter to the direction of travel via a first pivot axis and by its lower end indirectly to the supporting structure via a horizontal second pivot axis. The second link, on the other hand, consists of a damper having a pressure spring, which damper underpins the scraper in an articulated manner with a resiliently elastic restoring force approximately in the central length region and extends obliquely upwards in the direction of travel of the lower run. The first pivot axis between the upper end of the first link and the scraper and the horizontally oriented second pivot axis between the lower end of the first link and the supporting structure are arranged obliquely to the direction of travel of the lower run, the angle between the two pivot axes, viewed from above, being an acute one. The second link extends obliquely laterally downwards from the scraper in the opposite direction to the first link, and is connected in the manner of a spatial joint both to the scraper and to the supporting structure via joint heads which form spatial joints. The angle of the inclined position of the scrapers relative to the direction of travel of the lower run is approximately 15°.

SUMMARY OF THE INVENTION

The arrangement known from DE 102 55 253 B3 has advantages with regard to the cleaning action compared with the arrangements used hitherto in practice for stripping material from a conveyor belt, but can still be improved. Practical tests have shown that the cleaning action of such an arrangement, in the case of an undulating path of the lower run, viewed in the transverse direction, in the middle of the conveyor belt is often not satisfactory. Although the mobility of the respective scraper is improved compared with the mobility of the scrapers of conventional devices for stripping material from the lower run of a conveyor belt, it is nevertheless limited, since each of the two end pivot axes of the first link has only one degree of freedom. Since conveyor belts usually bulge in the lower run, so that wave crests and wave troughs extending in the longitudinal direction of the lower run are produced, the bar-shaped scrapers arranged extending obliquely to the direction of travel of the lower run now and then do not lie against the lower run over their entire length of cleaning edge, so the desired cleaning effect is not obtained in places.

It is an object of the present invention to provide an arrangement for stripping material from the lower run of the conveyor belt of a belt conveyor which retains its proper functioning even when the conveyor belt becomes undulating and/or when damage on the conveyor belt or at the connections of the individual length portions of the conveyor belt exerts transverse stresses on the scrapers. In particular, it is an object of the invention to provide an arrangement for stripping material from the lower run of the conveyor belt of a belt conveyor which offers an improved, gentle cleaning action compared with the arrangement known from DE 102 55 253 B3, in particular in the case of an undulating conveyor belt.

The object is achieved by an arrangement having the features described herein.

The arrangement according to the invention has scrapers which are divided into groups, are arranged distributed over the width of the conveyor belt and lie resiliently elastically against the underside of the lower run, which scrapers are all arranged obliquely to the direction of travel of the lower run, the scrapers of a first group being oriented angled relative to the scrapers of an adjacent second group. The arrangement according to the invention is in addition characterised in that the respective scraper is supported at least indirectly on the supporting frame of the belt conveyor via at least two wound leg springs, the respective leg spring being connected by its upper end to a front or rear, in the direction of travel, end portion of the scraper, being connected rotatably by its lower end to a transverse strut of a supporting frame mounted on the supporting structure of the belt conveyor, and having at least one leg portion pointing substantially obliquely to the direction of travel and also obliquely downwards counter to the direction of travel.

The arrangement according to the invention is distinguished by a relatively low mass. Due to the leg springs, the scrapers have more degrees of freedom and also a low mass moment of inertia, so that they can adapt more accurately and rapidly to the contour (topography) of the underside of the lower run of the conveyor belt. The leg springs improve the flexibility of the scrapers in particular upon striking damaged spots on the conveyor belt and connection points of the individual length portions of the conveyor belt.

The resiliently elastic supporting according to the invention of the respective scraper by means of at least two special leg springs ensures that the scraper not only can dip downwards if material to be scraped off adheres extremely hard to the underside of the lower run, so that the scraper, if necessary, can slide over this material, but that the scraper can also yield laterally if damage to the conveyor belt or to the belt connections exerts transverse stresses thereon.

In an advantageous configuration of the arrangement according to the invention, the respective scraper is arranged obliquely to the direction of travel of the lower run at an angle in the range of 25° to 55°, preferably in the range of 30° to 50°.

A further advantageous configuration of the arrangement according to the invention consists in that the leg springs mounted on the respective scraper are formed substantially identically and/or are oriented in the same direction. This means that the manufacture of the leg springs or the assembly of the arrangement can be streamlined, which means that overall reduced manufacturing costs can be achieved for the arrangement according to the invention. The leg springs of the first group are preferably formed mirror-invertedly to the leg springs of the second group.

According to a further preferred configuration of the invention, the upper leg-spring end is connected in articulated manner to the front or rear end portion of the scraper. The articulated connection of the scraper to the upper leg-spring end improves the possibilities of movement of the respective scraper with regard to an optimum cleaning action and also flexibility for yielding of the scraper upon striking belt connection means and/or damaged spots protruding from the conveyor belt, in particular solid-body parts.

A further advantageous configuration of the arrangement according to the invention is characterised in that the lower leg-spring end is rotatably inserted into a bore formed in the transverse strut, the longitudinal axis of the bore extending obliquely to the vertical. This configuration likewise improves the possibilities of movement of the respective scraper with regard to an optimum cleaning action and the ability of the scraper to deflect upon striking belt connection means and/or solid bodies protruding from the conveyor belt. In particular, this configuration can ensure that, in the event of possible breaking of the scraper as the result of a severe impact, the leg spring with a fragment of the scraper still fastened thereto pivots away from the conveyor belt, so that the sharp-edged scraper fragment does not damage the conveyor belt.

In order to obtain a structurally simple and reliable connection, preferably an articulated connection, between the leg spring and scraper, a further preferred configuration of the invention provides for the upper leg-spring end to be formed in the shape of an eye. The eye-shaped leg-spring end can be placed rotatably on a corresponding screw bolt or bolt rivet, which can then be connected to the scraper or a support holding the scraper.

With regard to an optimum cleaning action and flexible deflection behaviour of the respective scraper upon striking belt connection means or foreign bodies protruding from the underside of the conveyor belt, it is further advantageous if, according to a further preferred configuration of the invention, the upper leg-spring end encloses an angle in the range of 95° and 120°, preferably in the range of 100° to 115°, with the at least one leg portion of the leg spring pointing substantially obliquely to the direction of travel of the lower run of the conveyor belt and obliquely downwards counter to the direction of travel of the lower run.

Further, it is advantageous for an optimum cleaning action if, according to a preferred configuration, the respective scraper is oriented tilted about its longitudinal axis relative to the plane of the underside of the lower run, the angle between the underside of the lower run and the central longitudinal plane of the scraper lying in the range of 95° to 115°, preferably lying in the range of 100° to 115°. This results in a piercing method of operation of the respective scraper.

A further configuration which is beneficial for the cleaning action and the flexible, rapid deflection behaviour of the scraper is characterised in that the respective leg spring has at least one resilient winding and two legs pointing substantially obliquely to the direction of travel and obliquely downwards counter to the direction of travel, the at least one resilient winding preferably being integrated between the two leg portions pointing substantially obliquely to the direction of travel and obliquely downwards counter to the direction of travel.

Furthermore, it has proved beneficial for the cleaning action of the bar-shaped scrapers if, according to a further preferred configuration of the invention, the lower leg-spring end encloses an angle in the range of 110° and 120°, preferably in the range of 112° to 118°, with the at least one leg portion of the leg spring pointing substantially obliquely to the direction of travel of the lower run of the conveyor belt and obliquely downwards counter to the direction of travel of the lower run.

BRIEF DESCRIPTION OF THE DRAWINGS

The invention will be explained in greater detail below with reference to drawings showing a plurality of examples of embodiment. These show:

FIG. 4 a vertical cross-section through the representation of FIG. 2 along the line A-A;

FIG. 5 a vertical cross-section through the representation of FIG. 3 along the line B-B;

FIG. 12 a further vertical cross-section through a scraper in the region of connection of a leg spring.

DETAILED DESCRIPTION OF THE INVENTION

Figure 1:
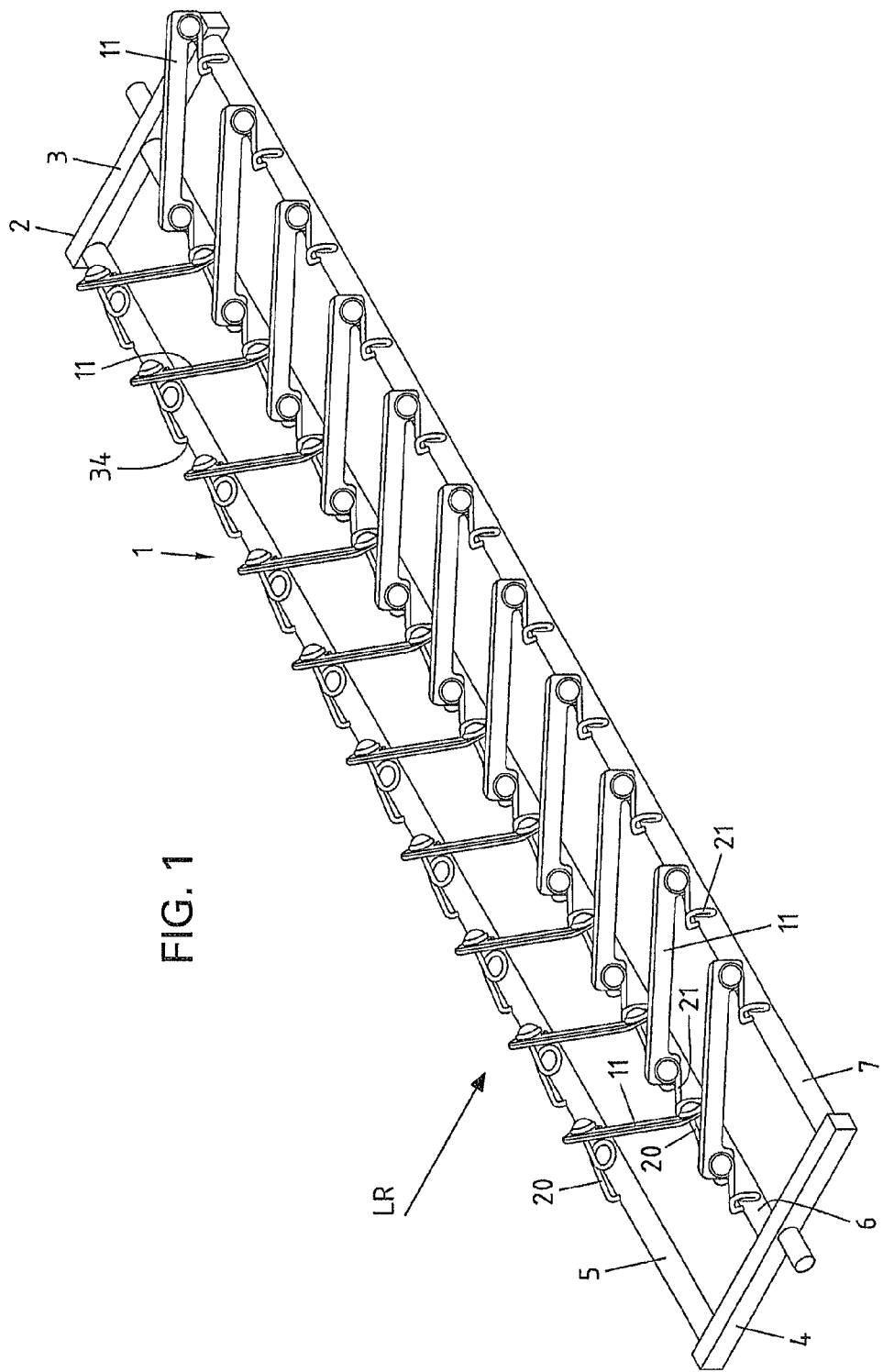
FIG. 1 a perspective view of an arrangement for stripping material from the lower run of the conveyor belt of a belt conveyor.
Figure 2:
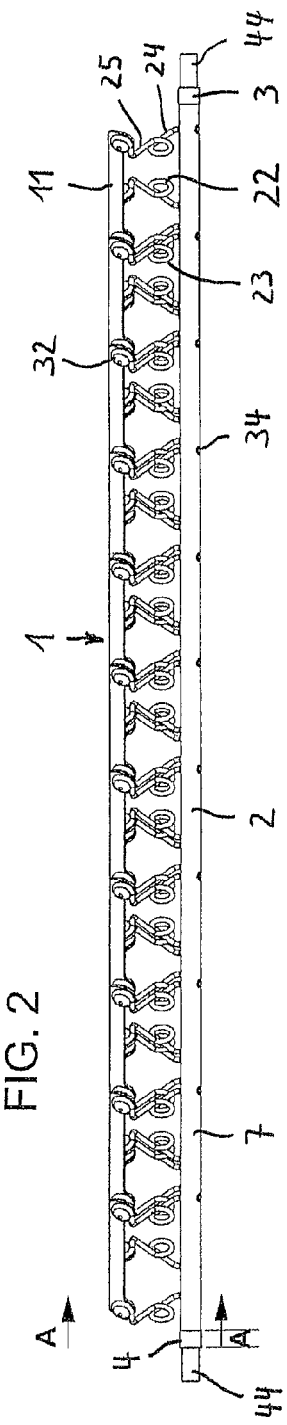
FIG. 2 the arrangement for stripping material according to FIG. 1, in a front view.

In the drawing, 1 designates an arrangement for stripping material from the lower run of the conveyor belt of a belt conveyor. The arrangement 1 comprises a preassembled supporting frame 2, which can be integrated detachably and adjustably in the supporting structure, not shown further, of the belt conveyor.

Three transverse struts 5, 6, 7 are held on two longitudinal members 3, 4 of the supporting frame 2, which struts consist of tubes or solid-material rods. In the example of embodiment illustrated, the transverse struts 5, 6, 7 are formed from solid-material rods or round rods. The transverse struts 5, 6, 7 serve for pivotably movable supporting of bar-shaped scrapers 11 which lie against the underside 8 of the lower run 9 of the conveyor belt 10 (cf. FIG. 4).

Figure 10:
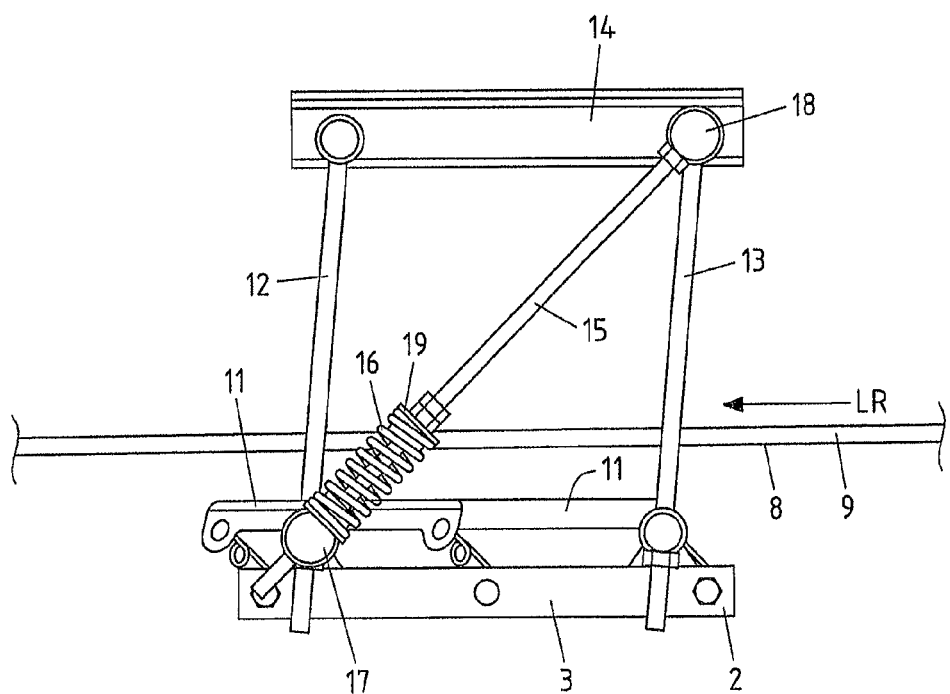
FIG. 10 the arrangement for stripping material according to FIG. 1 with a link suspension which can be mounted on the supporting structure of a belt conveyor, in a side view.

The supporting frame 2 is preferably suspended on the supporting structure of the belt conveyor by means of links 12, 13 (cf. FIG. 10). In each case two links 12, 13 are articulated by their lower ends to the longitudinal members 3, 4 of the supporting frame 2. The upper ends of the links 12, 13 are articulated to an upper longitudinal member 14 which is connected to the supporting structure of the belt conveyor, or directly to the supporting structure of the belt conveyor, so that a parallelogram suspension is yielded. The distance between the axes of rotation of the joints of the upper longitudinal member 14 corresponds to the distance between the axes of rotation of the joints of the longitudinal member 3, 4 of the supporting frame 2. Between the rear link 12, in the direction of travel LR of the lower run 9, and the front link 13 there is incorporated a third link (diagonal link) 15 which is provided with an integrated pressure spring 16. The diagonally-arranged link 15 in this case is articulated to the rear joint 17, in the direction of travel LR of the lower run 9, of the longitudinal member 3 of the supporting frame 2 and to the front joint 18, in the direction of travel of the lower run 9, of the upper longitudinal member 14 or supporting structure. The distance between these two joints 17, 18 or the axes of rotation thereof, and hence the position of the supporting frame 2 relative to the lower run 9, is adjustable. For this, the third link 15 has, at least on a lower length portion, an end portion, formed as a threaded rod, with nuts and lock nuts. Preferably, all three links 12, 13, 15 which are fixed to the respective longitudinal member of the supporting frame 2 in an articulated manner are formed from threaded rods, on the ends of which pivot pins which are connected rotatably or pivotably to the longitudinal members 3, 4, 14 or the supporting structure are mounted. Further, the third link 15 has a supporting bearing 19 for the pressure spring 16 between the joints 17, 18. The supporting bearing 19 may for example be formed by nuts (nut and lock nut) screwed onto the threaded rod 15 and an annular supporting disc, the supporting disc preferably being provided with a hollow-cylindrical journal which is placed thereon in one piece, which journal engages in the pressure spring 16.

The scrapers 11 are arranged in two rows R1, R2 which lie one behind the other in the direction of travel LR of the lower run 9. The scrapers 11 in the respective row form a group G1 or G2. The scrapers 11 in the groups G1, G2 all extend obliquely to the direction of travel LR of the lower run 9, the scrapers 11 of the one group G1 however being oriented angled relative to the scrapers 11 of the adjacent other group G2. The scrapers 11 of the respective group G1, G2 or row R1, R2 are oriented parallel to one another in each case. The angle φ of the inclination of the scrapers 11 relative to the direction of travel LR of the lower run 9 is approximately 40°.

The scrapers 11 of the second row R2 are arranged relative to the scrapers 11 of the first row R1 such that each point on the underside 8 of the lower run 9 which is swept by the scrapers 11 of the first row R1 is brushed or cleaned at least twice by the scrapers 11 of the second row R2.

This arrangement of the scrapers 11 relative to the underside 8 of the lower run 9 means that all the regions of the lower run are contacted by the scrapers 11 for cleaning across the entire width B. Furthermore, this herringbone arrangement of the scrapers 11 ensures that no transverse stresses which might lead to displacement of the lower run 9 transversely to its direction of travel LR are exerted on the lower run 9.

The ratio of the length LS of the long edge of the respective scraper 11 which contacts the underside 8 of the lower run 9 to the shortest distance AS between two adjacent scrapers 11 of a row R1, R2 or group G1, G2 preferably lies in the range of 2.5 to 1.8. In the example of embodiment illustrated, this ratio LS:AS lies approximately in the range of 1.9 to 2.1 (cf. FIG. 3).

The respective scraper 11 is supported via two wound leg springs 20, 21 on two adjacent transverse struts 4, 5 or 5, 6 respectively in each case of the transverse struts which extend parallel to each other. The respective leg spring 20, 21 in this case is connected by its upper end in an articulated manner to the front end portion 11.1 or the rear end portion 11.2, in the direction of travel LR of the lower run 9 of the conveyor belt 10, of the scraper 11, and by its lower end in an articulated manner to the transverse strut 4, 5 or 6 respectively. The leg springs 20, 21 are formed from round-rod spring steel, which has a diameter of for example approximately 6 mm.

The leg springs 20 or 21 of the respective scraper 11 are formed identically. Likewise, the leg springs 20 or 21 of the respective row R1, R2 or group G1, G2 are formed identically and oriented in the same direction. The leg springs 20 of one row R1 or group G1, however, differ from the leg springs 21 of the other row R2 or group G2 insofar as they are formed mirror-invertedly to each other.

FIGS. 6 to 9 show a leg spring 20 which corresponds to the leg springs in the first row R1 (group G1), viewed in the direction of travel LR of the lower run 9.

Figure 3:
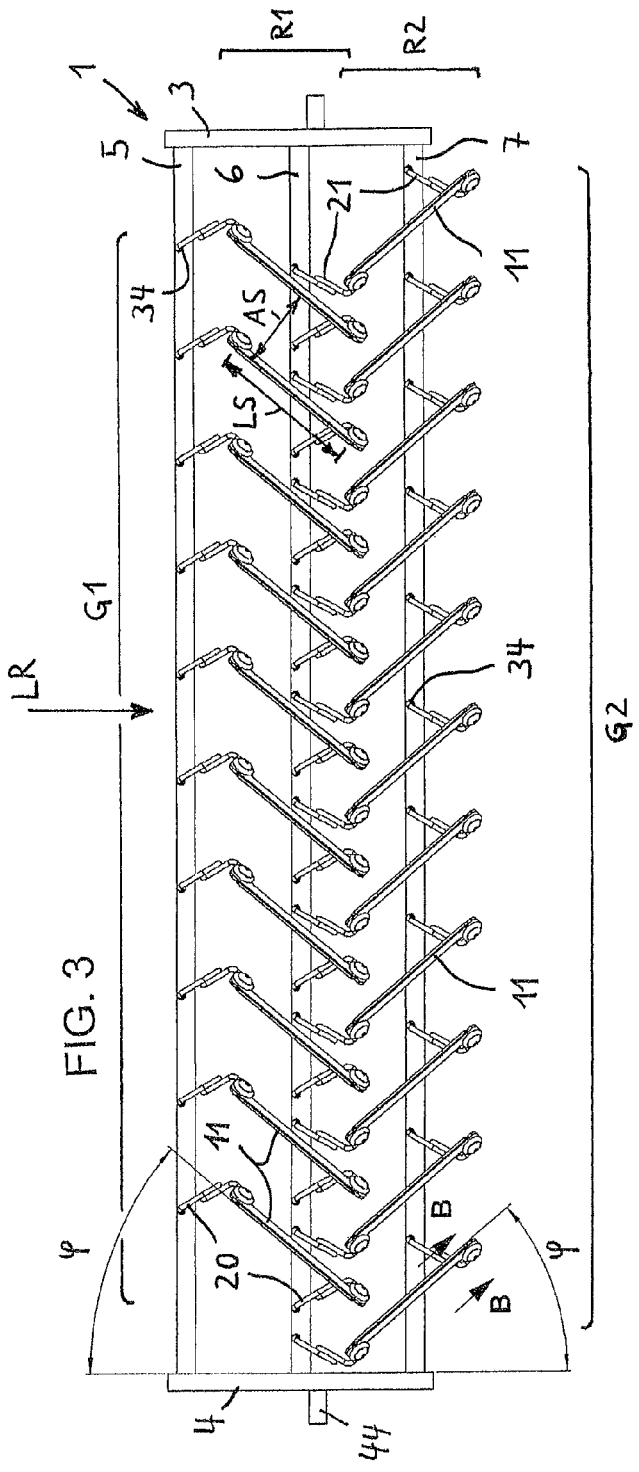
FIG. 3 the arrangement for stripping material according to FIG. 1, in a top view.
Figure 7:
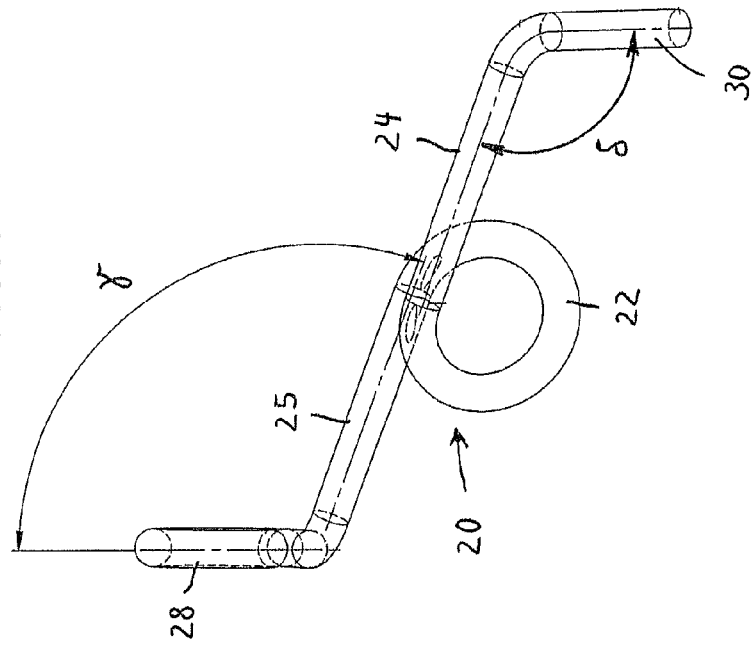
FIG. 7 the leg spring of FIG. 6 in a top view.
Figure 6:
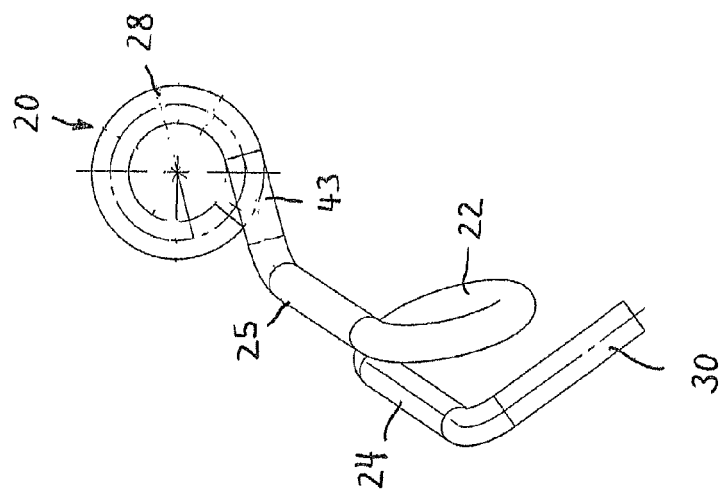
FIG. 6 a leg spring inserted in the arrangement for stripping material of FIG. 1, viewed from below.
Figure 8:
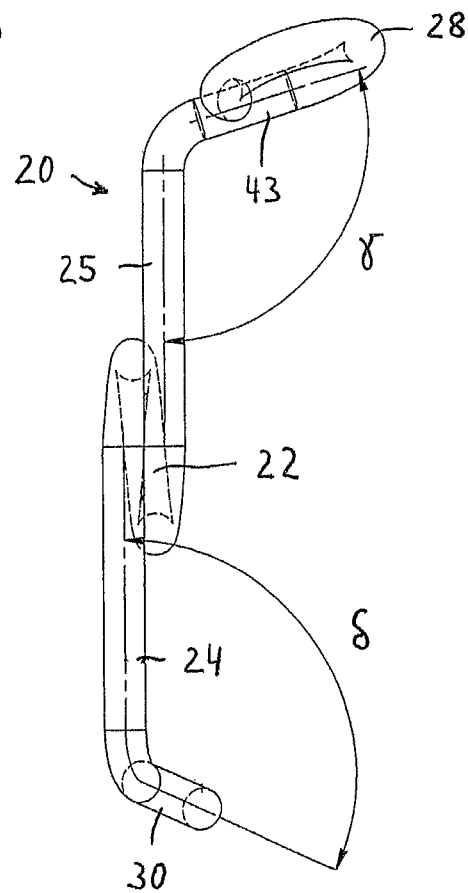
FIG. 8 the leg spring of FIG. 6 in a perspective view.

The arrow LR in FIGS. 1 and 3 indicates the direction of travel LR of the lower run 9 of the conveyor belt (not shown there). Each of the leg springs 20, 21 has a resilient winding 22 or 23 respectively and two leg portions 24, 25 or 26, 27 respectively pointing substantially obliquely to the direction of travel LR and obliquely downwards counter to the direction of travel LR. The winding 22, 23 is integrated between the two rectilinear leg portions 24, 25 or 26, 27 respectively (cf. in particular FIG. 4).

The upper leg-spring end 28, 29 and the lower leg-spring end 30, 31 are in each case angled relative to the leg portions 24, 25 or 26, 27 respectively coming from the winding 22, 23. The two rectilinear leg portions 24, 25 or 26, 27 respectively, which start from the winding 22, 23 and extend as far as the angled leg-spring ends 28, 30 or 29, 31 respectively, are substantially of the same length. The ends 28, 30 or 29, 31 respectively of the respective leg spring 20, 21 are angled in different directions and with different angles γ and δ relative to the central leg portions 24, 25 or 26, 27 respectively.

Figure 9:
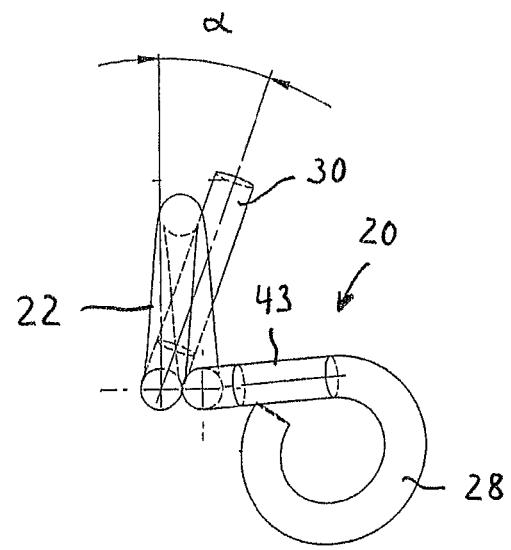
FIG. 9 the leg spring of FIG. 6 in a side view.

The lower leg-spring end 30, 31 is in addition angled relative to the central radial plane of the winding 22, 23, the angle α between the longitudinal centre line of the lower leg-spring end 30, 31 and the central radial plane of the winding 22, 23 being approximately 20° (cf. FIG. 9). The longitudinal centre line of the lower leg-spring end 30, 31 is thus formed twisted relative to the radial plane of the winding.

The upper leg-spring end 28 or 29 is formed in the shape of an eye and connected to the scraper 11 by means of a metal bolt or rivet 32 (cf. FIG. 5). A spacer ring 33 in the form of a sleeve is placed on the metal bolt or rivet 32, the axial length of which sleeve is somewhat greater than the diameter of the round-rod spring steel of the leg spring 21 (or 20). The sleeve 33 is arranged within the leg-spring eye 28, 29 and is clamped between the scraper 11 and the head of the metal bolt or rivet 32 which has a greater diameter. The internal diameter of the leg-spring eye 28, 29 is greater than the external diameter of the sleeve 33.

Thus it is ensured that the connection between the upper end 28, 29 of the leg spring 20, 21 and the scraper 11 is an articulated connection with great ease of movement.

The lower leg-spring end 30, 31 is rotatably inserted in a bore 34 formed in the transverse strut 5, 6, 7. The longitudinal axis of the bore 34 extends obliquely to the vertical, and substantially at right-angles to the longitudinal axis of the respective transverse strut 5, 6, 7. The angle β enclosed by the longitudinal centre line of the bore 34 and the vertical lies in the range of 25° and 35°, and is for example approximately 30°. The lower leg-spring end 30, 31 is provided with a metal sleeve 36 having a collar or flange 35, which sleeve is inserted into the bore 34 associated with the lower leg-spring end.

The upper, eye-shaped leg-spring end 28, 29 or the substantially rectilinear, angled leg portion 43 encloses an angle γ in the range of 95° and 120° with the rectilinear leg portion 25 or 27 respectively of the leg spring 20, 21 pointing obliquely to the direction of travel LR and obliquely downwards counter to the direction of travel LR. For the leg spring 20 illustrated in FIGS. 6 to 9, the angle γ is approximately 110°. The lower leg-spring end 30, 31 on the other hand encloses an angle δ in the region of approximately 114° with the rectilinear leg portion 24 or 26 respectively pointing obliquely to the direction of travel LR and obliquely downwards counter to the direction of travel LR.

Each scraper 11 is formed from a supporting bar 37 and a scraping bar 38 which is connected thereto. The supporting bar 37 preferably consists of metal which can be soldered, whereas the scraping bar 38 is manufactured from harder material, typically from hard metal. The supporting bar 37 has a shoulder 39 extending along its upper long edge, on which shoulder the scraping bar 38 is supported (cf. FIG. 5).

Further, the flank of the supporting bar 37 which faces the scraping bar 38 may be bevelled relative to its lower side portion 40, so that the scraping bar 38 is arranged tilted relative to the plane of the side portion 40. The tilting angle preferably lies in a region from 10° to 15°. The scraping bar 38 and supporting bar 37 are joined together by a bonded connection, for example soldered together.

In one embodiment, provision is made for the long edge of the scraping bar 38 which faces the lower run 9 to project slightly above the supporting bar 37, for example by a height in the range of 0.5 to 1 mm. Alternatively, the upper long edge (stripping edge) of the scraping bar 38 may however also be formed flush with the upper long edge of the supporting bar 37, as is illustrated by way of example in FIG. 12.

As FIGS. 3, 5 and 12 show, each scraper 11 is tilted about its longitudinal axis relative to the underside 8 of the lower run 9. The angle ε between the underside 8 of the lower run 9 and the central longitudinal plane of the scraping bar 38 lies in the range of approximately 95° to 115°, preferably in the range of 100° to 115°.

The ends 41, 42 of the scraping bar 38 are bevelled on the long edge facing the lower run 9. The scraping bar 38 wears during operation of the belt conveyor. The inclined surfaces formed at the ends 40, 41 of the scraping bar 38 offer the advantage that substantially no change in the edge sharpness occurs until the wear limit is reached. Owing to the piercing method of operation of the respective scraper 11, it retains its edge sharpness during operation. The scraper 11, practically speaking, is ground "sharp" again and again.

The arrangement 1 according to the invention for stripping material from the lower run 9 of the conveyor belt of a belt conveyor is preferably provided, with the exception of the scraping bars 38, with a casing or coating (not shown) of plastics material or elastomer. The material of the casing or coating is relatively soft and elastic. It has, for example, a Shore hardness of approximately 45.

Figure 11:
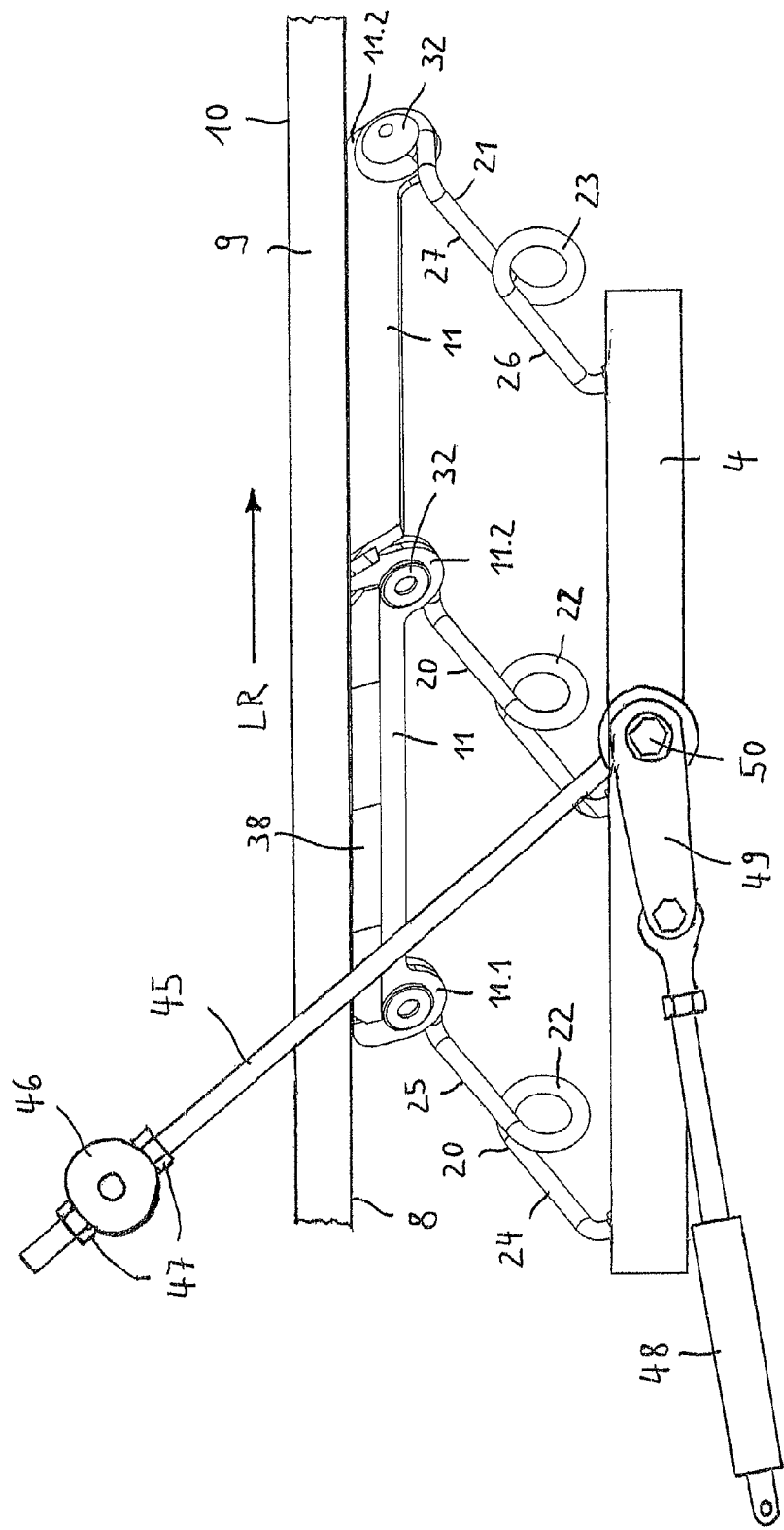
FIG. 11 the arrangement for stripping material according to FIG. 1 with a second embodiment of a link suspension (holding means) which can be mounted on the supporting structure of a belt conveyor, in a side view.

FIG. 11 illustrates a further example of embodiment for a suspension means or holding means of the arrangement according to the invention 1 for stripping material from the lower run 9 of the conveyor belt 9 of a belt conveyor. On the outsides of the longitudinal members 3, 4 there are attached journals 44, to which in each case a link 45 which is oriented obliquely upwards is fixed in an articulated manner. The upper end of the link 45 is provided with a thread on which a joint holding means 46 which can be connected to the supporting structure of the belt conveyor is mounted. The position of the joint holding means 46 on the rod-shaped link or the effective length of the link 45 can be fixed by means of nuts 47. Further, a two-member tensioning means is fixed to the journal 44, which means comprises a damper 48 and a joint plate 49. The end of the damper 48 which is remote from the journal is provided with a joint eye, in order to be able to connect the damper 48 likewise to the supporting structure of the belt conveyor. The end of the damper 48 which faces the journal 44 is connected in an articulated manner to the joint plate 49, which in turn is connected in an articulated manner to the journal 44. Once the arrangement 1 has been oriented relative to the underside 8 of the lower run 9, the joint plate 49 is fixed on the journal by means of a screw 50, so that the arrangement 1 is pressed against the underside 8 of the lower run 9 by means of the damper. In normal operation of the conveyor belt, the damper 48 is under tension. If the conveyor belt 10 however moves counter to the direction of travel LR, the damper 48 is under compression. The holding means (suspension means) according to FIG. 11 takes account of the fact that when the conveyor belt 10 is stopped, the conveyor belt 10 not infrequently runs back counter to the direction of travel LR.

LIST OF REFERENCE NUMERALS 1 arrangement for stripping material
2 supporting frame
3 longitudinal member of the supporting frame
4 longitudinal member of the supporting frame
5 transverse strut of the supporting frame
6 transverse strut of the supporting frame
7 transverse strut of the supporting frame
8 underside of the lower run
9 lower run of the conveyor belt
10 conveyor belt
11 scraper
11.1 front end portion of the scraper
11.2 rear end portion of the scraper
12 link
13 link
14 longitudinal member
15 link (threaded rod)
16 pressure spring
17 joint
18 joint
19 supporting bearing of the pressure spring
20 leg spring
21 leg spring
22 resilient winding of the leg spring
23 resilient winding of the leg spring
24 straight leg-spring portion
25 straight leg-spring portion
26 straight leg-spring portion
27 straight leg-spring portion
28 upper leg-spring end of 20
29 upper leg-spring end of 20.
30 lower leg-spring end of 21
31 lower leg-spring end of 21
32 rivet (metal bolt)
33 sleeve
34 bore
35 flange of the metal sleeve
36 metal sleeve
37 supporting bar
38 scraping bar
39 shoulder of the supporting bar
40 lower side portion of the scraping bar
41 end of the scraping bar
42 end of the scraping bar
43 rectilinear, angled leg portion
44 journal
45 link
46 joint holding means
47 nuts
48 damper
49 joint plate
50 screw
AS shortest distance between two scrapers of a row
LS length of the edge of the scraper contacting the lower run LR direction of travel of the lower run
G1 group
G2 group
R1 row
R2 row
α angle between the longitudinal centre line of the lower leg-spring end and the radial plane of the winding
β angle of the longitudinal centre line of the bore relative to the vertical
γ angle between rectilinear leg-spring portion and angled leg-spring end
δ angle between rectilinear leg-spring portion and angled leg-spring end
φ angle of the inclination of the scraper relative to the direction of travel of the lower run
ε angle between the longitudinal centre line of the scraper and the underside of the lower run

The invention claimed is:

1. An arrangement for stripping material from a lower run of a conveyor belt of a belt conveyor, the arrangement comprising:
   scrapers divided into groups distributed over a width of the conveyor belt, and lying resiliently elastically against an underside of the lower run,
   wherein scrapers are arranged obliquely to a direction of travel of the lower run,
   wherein the scrapers of a first group are oriented angled relative to the scrapers of an adjacent second group,
   wherein each respective scraper is supported at least indirectly on a supporting frame of the belt conveyor via at least two wound leg springs,
   wherein each respective leg spring is connected by its upper end to a front or rear, in the direction of travel, end portion of the scraper,
   wherein each respective leg spring is connected rotatably by its lower end to a transverse strut of the supporting frame mounted on the supporting structure of the belt conveyor, and
   wherein each respective leg spring has at least one leg portion pointing substantially obliquely to the direction of travel and also obliquely downwards counter to the direction of travel.

2. The arrangement according to claim 1, wherein each respective scraper is arranged obliquely to a direction of travel of the lower run at an angle in the range of 25° to 55°.

3. The arrangement according to claim 1, wherein the leg springs mounted on each respective scraper are formed substantially identically or are oriented in the same direction.

4. The arrangement according to claim 1, wherein the upper leg-spring end is connected in an articulated manner to the front or rear end portion of the scraper.

5. The arrangement according to claim 1, wherein the lower leg-spring end is rotatably inserted into a bore formed in the transverse strut, and wherein a longitudinal axis of the bore extends obliquely to vertical line.

6. The arrangement according to claim 1, wherein the upper leg-spring end is formed in a shape of an eye.

7. The arrangement according to claim 1, wherein each respective scraper is tilted about its longitudinal axis relative to the plane of the underside of the lower run, and wherein the angle between the underside of the lower run and the central longitudinal plane of the scraper is in the range of 95° to 115°.

8. The arrangement according to claim 1, wherein the upper leg-spring end encloses an angle in the range of 95° and 120° with the at least one leg portion of the leg spring pointing substantially obliquely to the direction of travel and obliquely downwards counter to the direction of travel.

9. The arrangement according to claim 1, wherein each respective leg spring has at least one resilient winding and two leg portions pointing substantially obliquely to the direction of travel and obliquely downwards counter to the direction of travel.

10. The arrangement according to claim 9, wherein the at least one resilient winding is integrated between the two leg portions pointing substantially obliquely to the direction of travel and obliquely downwards counter to the direction of travel.

11. The arrangement according to claim 1, wherein the lower leg-spring end encloses an angle in the range of 110° and 120° with the at least one leg portion of the leg spring pointing substantially obliquely to the direction of travel and obliquely downwards counter to the direction of travel.

* * * * *